Patented Feb. 23, 1937

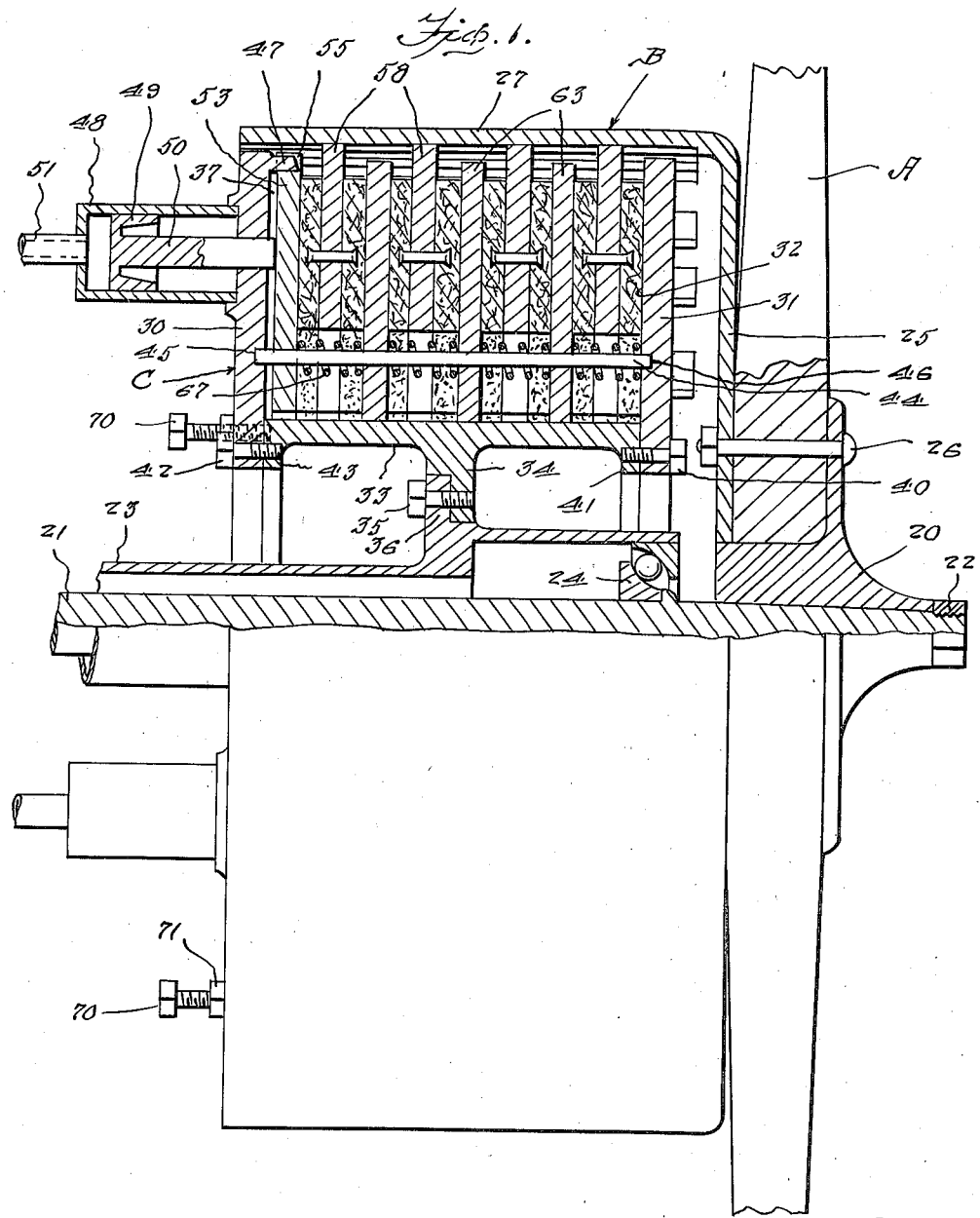

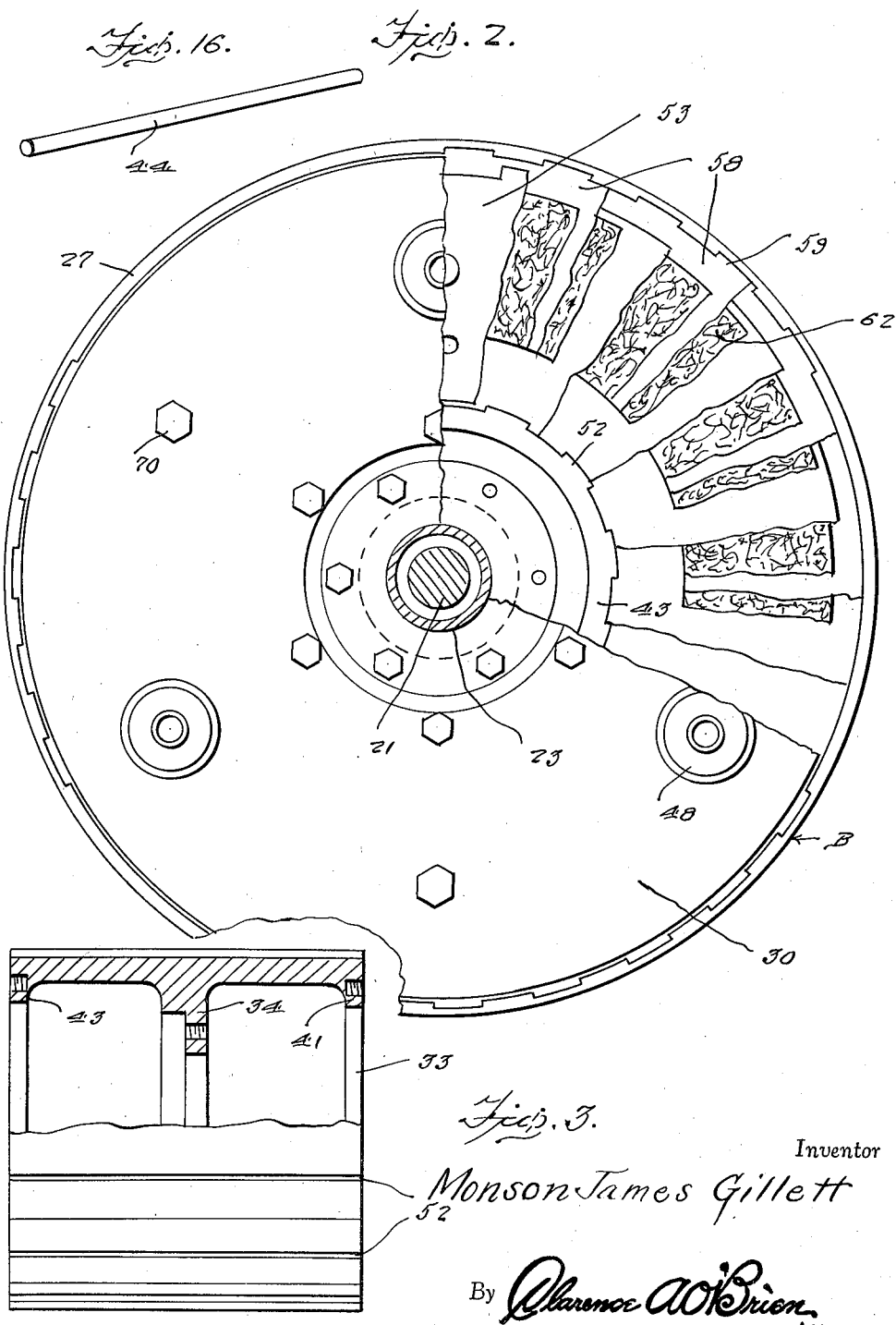

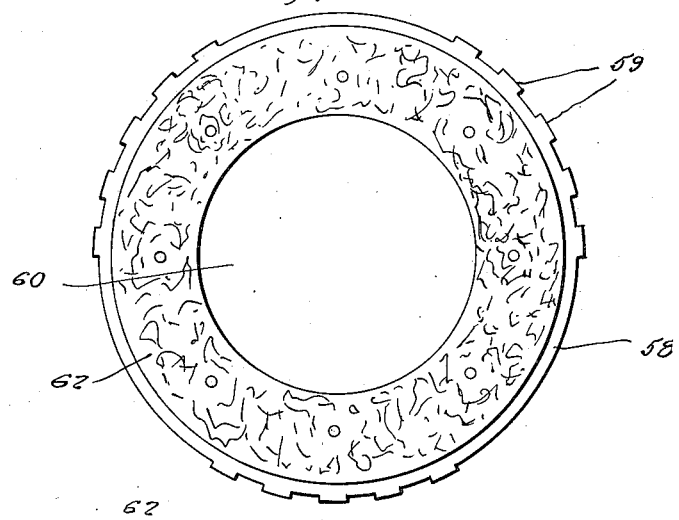
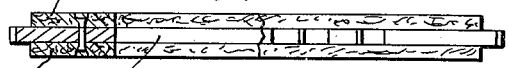
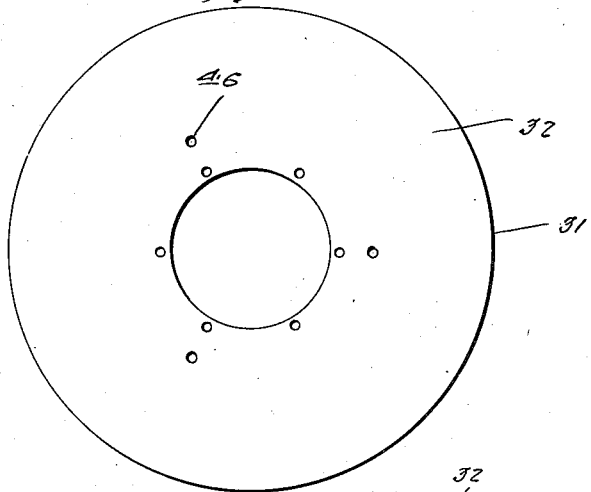

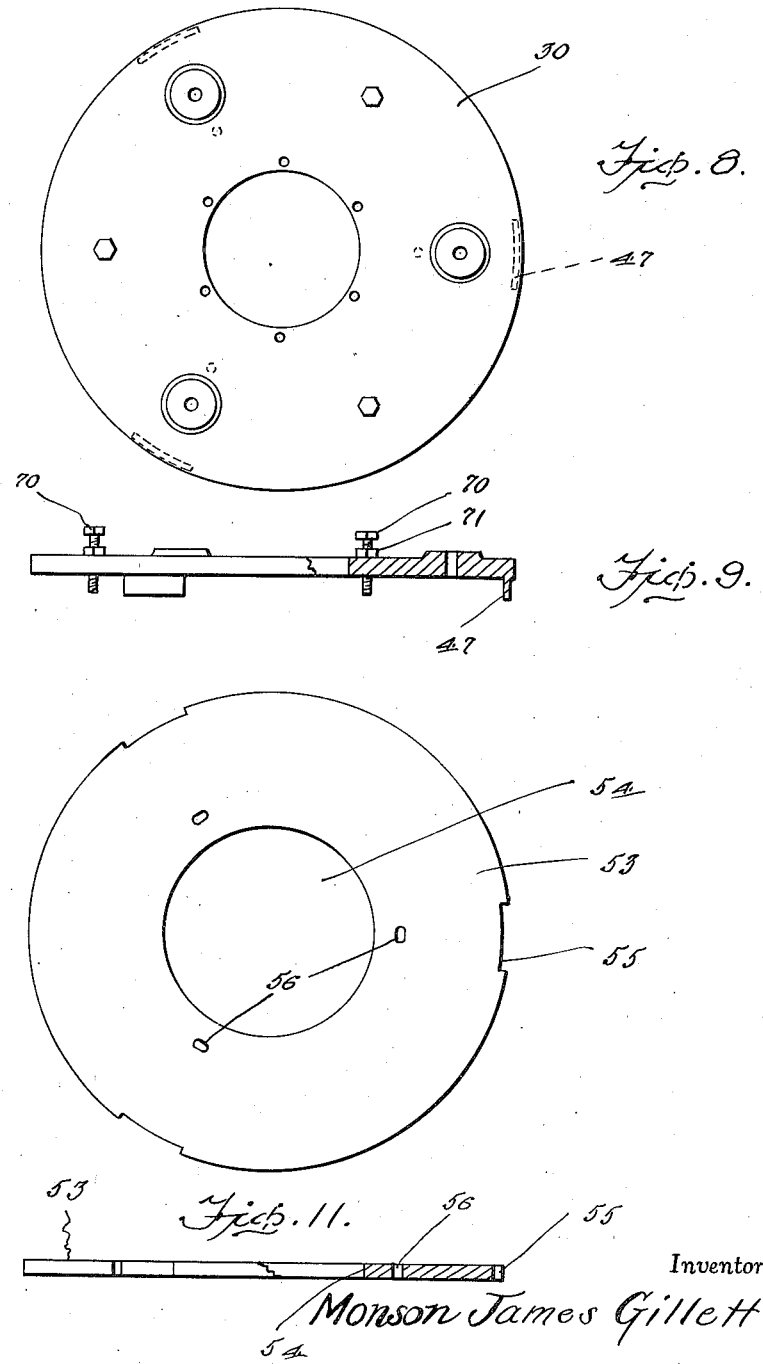

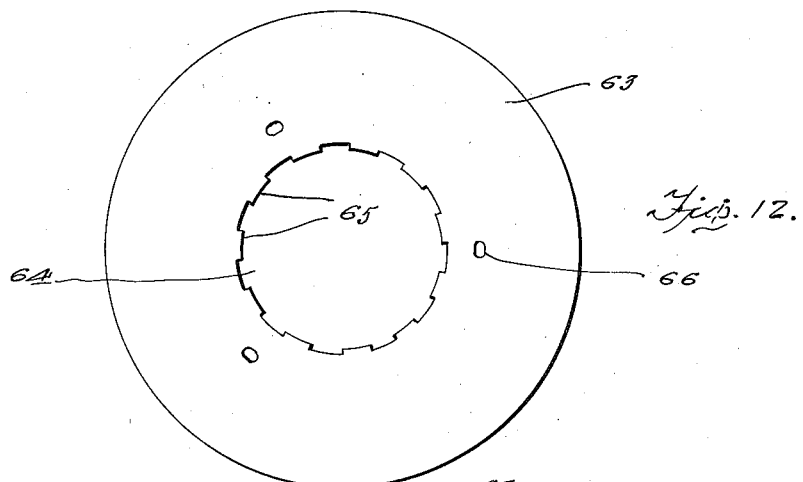
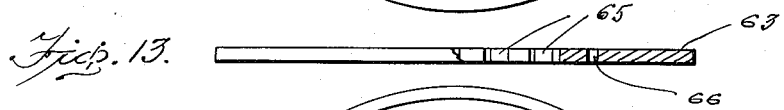
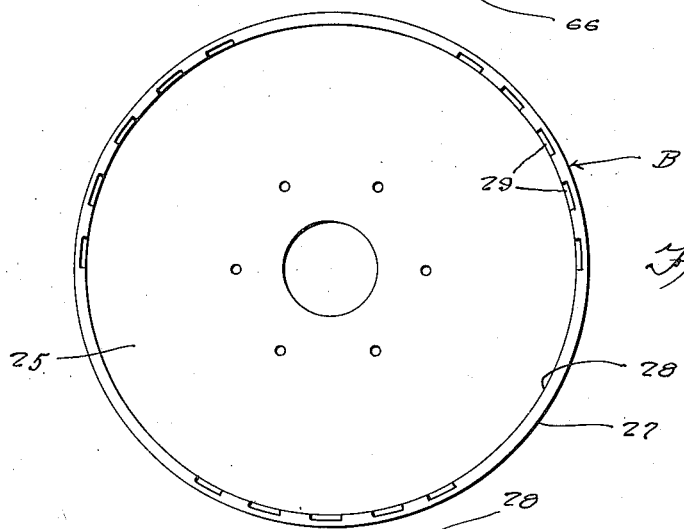
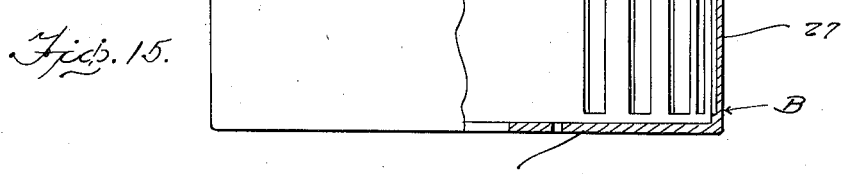

2,071,788

UNITED STATES PATENT OFFICE 2,071,788

INTERNALLY CONTRACTING DISK BRAKE FOR VEHICLES

Monson James Gillett, Halifax, Nova Scotia, Canada, assignor of one-half to Ivan S. Freeman, Halifax, Nova Scotia, Canada Application February 12, 1935, Serial No. 6,242

2 Claims. (Cl. 188—72)

This invention relates to disk brakes for vehicle wheels.

One of the objects of the invention is to provide disk brakes for vehicle wheels utilizing a non-rotating disk or series of disks frictionally engaging with a revolving disk or series of disks so as to control the movement of vehicles.

Another feature of the present invention is to arrange the disk brakes compactly within a substantially fluid tight housing so as to overcome trouble from grease and water on the friction surfaces, that substantially eliminates any grit or road dirt from the friction surfaces, that is substantially free from distortion that promotes easy adjustment to compensate for wear, and that is substantially free from grabbing.

Further objects of the invention are to devise a brake that furnishes greater braking capacity than is customary on internally expanding brakes with drums of the same dimensions that has a braking capacity that does not vary through wear in the individual brake disks thereby maintaining all brakes equal, and that is comparatively inexpensive to manufacture.

With the foregoing and other objects in view the invention consists of a novel construction, combination and arrangement of parts as will be hereinafter more specifically described and illustrated in the accompanying drawings wherein is disclosed an embodiment of the invention, but it is to be understood that changes, variations and modifications may be resorted to without departing from the spirit of the claims hereunto appended.

In the drawings wherein like reference characters denote corresponding parts throughout the several views:

Figure 1 is a fragmentary, sectional elevation of a vehicle wheel, showing the device of the present invention partly in elevation and partly in radial detailed section coupled to the wheel.

Figure 2 is an inside elevation thereof, having parts broken away.

Figure 3 is a sectional elevation of the sleeve for the housing.

Figure 4 is an elevation of the rotating brake disk.

Figure 5 is a sectional edge view of Figure 4.

Figure 6 is an elevation of the inner housing plate.

Figure 7 is a sectional edge view of Figure 6.

Figure 8 is an outside elevation of the outer housing plate.

Figure 9 is a sectional edge view of Figure 8.

Figure 10 is an elevation of the pressure disk.

Figure 11 is a sectional edge view of Figure 10.

Figure 12 is an elevation of the non-rotating friction disk.

Figure 13 is a sectional edge view of Figure 12.

Figure 14 is an inside elevation of the brake drum.

Figure 15 is a sectional elevation of Figure 14.

Figure 16 is a perspective view of one of the guide rods.

Referring to the drawings in detail, A indicates a vehicle wheel including a hub 20 rotatably connected with an axle 21 by the nut 22. Surrounding the axle 21 is the axle housing tube 23 having a bearing connection as at 24 with the axle 21.

A drum B has the radial wall 25 bolted as at 26 to the hub 20 of the wheel so that the drum rotates therewith. The peripheral face or flange 27 of the drum B extends inwardly and forms a dust proof cover for the internal disks. The inner wall 28 of the peripheral face or flange 27 is provided with a series of axially extending spaced grooves 29. The drum B is carried on the inside of the wheel A.

Confined within the drum B is a stationary housing C which includes the stationary outer plate 30 and the inner stationary plate 31, the latter presenting a friction surface 32 on its inner face. The brake housing C further includes a sleeve 33 having a central flange 34 bolted as at 35 to the upstanding flange 36 on the axle housing tube 23. It will be seen that the radial end plates 30, 31, the peripheral face or flange 27 of the drum and the housing sleeve 33 define a substantially closed chamber 37 in which is confined all of the braking surfaces thereby eliminating grit, grease and water from interfering with the brake control.

The outer edge of the inner end plate 31 is bolted as at 40 to the housing sleeve 33 which also has a depending flange 41 for that purpose. The inner edge of the inner end plate 30 is bolted as at 42 to the depending flange 43. Across the inner portion of the chamber 37 extends circumferentially spaced guide rods 44, preferably three in number, located equidistant from one another and the inner ends of the guide rods 44 conformably fit in the sockets 45 in the inner end plate, while the outer ends thereof seat in sockets 46 in the outer end plate. The inner end plate 30 closes the inner end of the drum B and the periphery thereof has a relatively tight fit with the outer edge of the flange 27 although there is no wiping engagement therebetween. Inwardly projecting lugs, preferably three in number, and indicated at 47 are formed on the outer margin of the inner end plate 30. Adjacent the outer margin of inner end plate 30 there is connected a hydraulic cylinder 48 in which operates the piston 49 carrying an integral plunger 50, the outer end of which extends through an opening in plate 30 for applying axial pressure to the disks as will presently appear. Connected to the outer end of the cylinder is a conductor 51 through which the liquid pressure is applied. Although I have illustrated braking pressure being applied by liquid, any other mechanism for applying axial pressure to the disks is within the contemplation of the present invention. On the outer periphery of the housing sleeve 33 are axially extending spaced grooves 52 which grooves are coextensive with the length of the sleeve and the chamber 31.

Edgewise in the chamber 37 next to the inner end plate 30 is mounted a non-rotating, axially movable disk 53 which shall be referred to hereafter as the pressure disk. The center of the disk 53 is formed with an opening 54 that encircles housing sleeve 33 and on the outer periphery thereof are three spaced notches 55 in which the lugs 47 fit. The guide rods 44 extend through oval shaped openings 56 so that the pressure disk is axially movable on these rods being urged outwardly by the end of the plunger 50 which bears against the inner face thereof. It will be noted that about the margin of the inner face, the pressure plate has a frictional engagement with the brake disk as will hereafter appear.

The following description concerns the invention as applied to multiple brake disks and multiple friction disks. A plurality of spaced rotating, axially movable brake disks 58 are mounted edgewise and in a radial direction with respect to the flange 27 of the drum B and on the outer peripheries thereof are spaced tongues 59 which have a sliding fit with the grooves 29 whereby the brake disks are splined for axial movement in the drum B. The center of the disk 58 has a relatively large opening 60 that straddles the guide rods 44. The opposed faces of these brake disks 58 have riveted thereto the composition rings 61, 62 preferably of an asbestos composition well known on the market. In between the spaced brake disks are mounted the friction disks 63, the peripheries of which terminate in spaced relation to the inner face of the flange 27. These friction disks 63 are non-rotating and for this purpose the opening 64 is provided with projecting teeth 65 which conformably seat in the grooves 52 by which the friction disks are only splined for axial movement. Adjacent the margin of the inner opening 64 the friction disks are provided with spaced oval openings 66 through which the intermediate portions of the rods 44 extend. It will be seen that the openings 64 in the friction disks 63 are smaller than the relatively large openings 60 of the brake disks 58 for the purpose of permitting the coil springs 67 embracing the guide rods 44 to bear against the friction disks and hold them apart. There is also a coil spring 67 between end plate 30 and the next friction disk 63 urging this plate and the next friction disk apart, while there is another coil spring 67 between outer end plate 31 and its opposed friction disk 63. These springs 67 normally maintain the friction disk out of engagement with the faces of the brake disks 58 until pressure is applied through the piston 50 to the pressure plate 53 which overcomes the action of these springs and compresses the multiple friction disks and brake disks to the right as shown in Figure 1 of the drawings whereby braking action is applied to the drum B. It will be seen that the spaced brake disks 58 rotate with the drum B between the non-rotating axially movable friction disks 63.

Extending through the inner end plate 30 are circumferentially spaced set screws 70 that may be locked in any desired adjusted position by the nuts 71, and the inner end of the shanks of these set screws bear against the inner face of the pressure plate 53 at equidistant points whereby tension on the coil springs 67 may be varied to adjust the braking action and also to compensate for wear on the brakes.

Having thus described the invention, what is claimed as new is:

1. A brake for vehicles comprising a brake drum including a flange, a stationary housing within the drum, a pair of plates secured to the ends of the housing one forming a braking surface and the other a cover plate for the drum, a pair of axially movable disks disposed in the housing, one of said disks splined on the housing and also slidably connected with the cover plate, means carried by the cover plate and engageable with said one disk for applying braking force, a rod on which said disks are slidable and spring means on said rod and bearing on said one disk to urge the disks apart when braking force is relaxed.

2. A brake for vehicles comprising a brake drum including a flange, a stationary housing within the drum, a pair of plates secured to the ends of the housing one forming a braking surface and the other a cover plate for the drum, a pair of axially movable disks disposed in the housing, one of said disks splined on the housing and also slidably connected with the cover plate, means carried by the cover plate and engageable with said one disk for applying braking force, spring means bearing on said one disk to urge the disks apart when braking force is relaxed, an axially extending rod supported between the pair of plates, and said one disk slidably supported on said rod.

MONSON JAMES GILLETT.